UNITED STATES PATENT OFFICE.

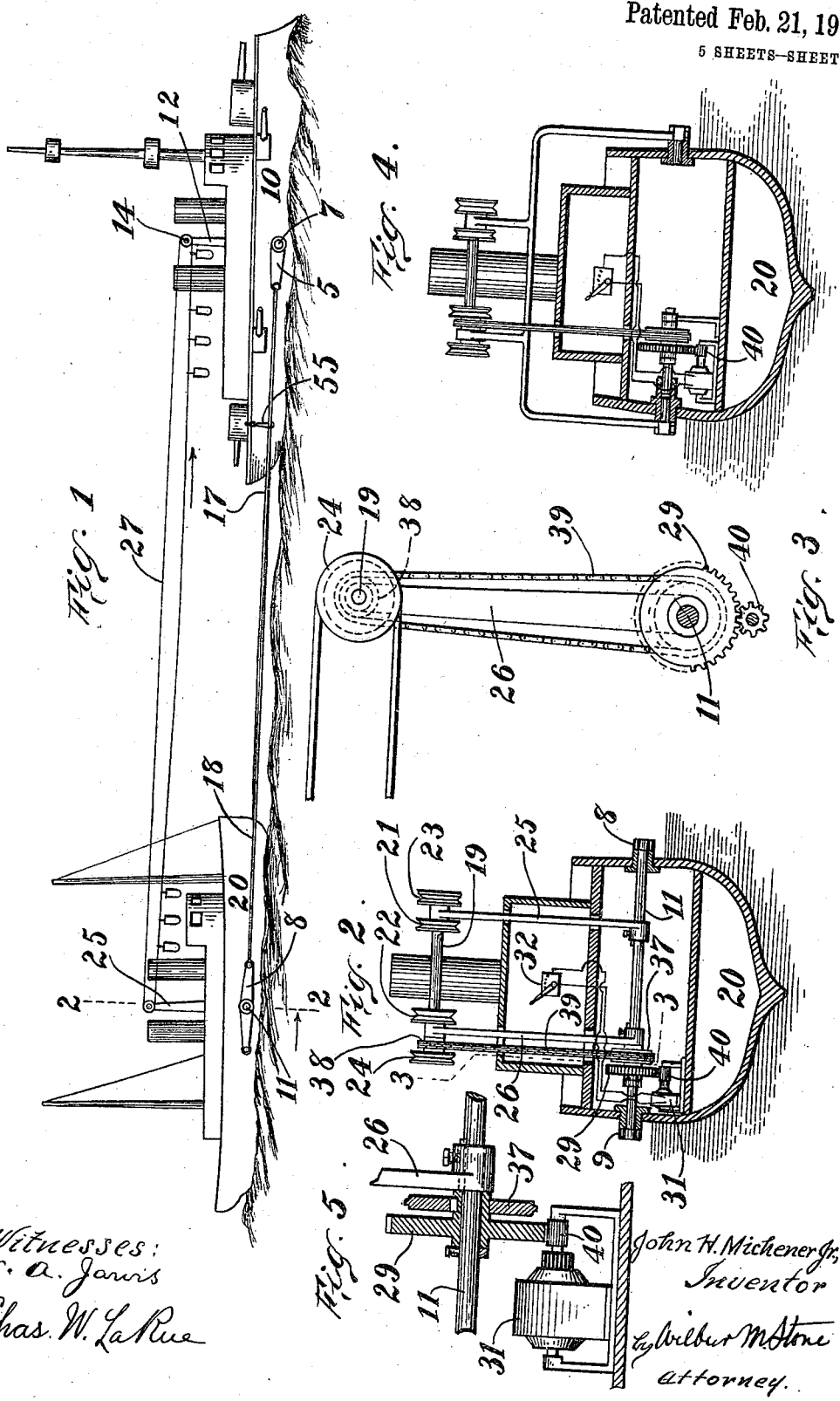

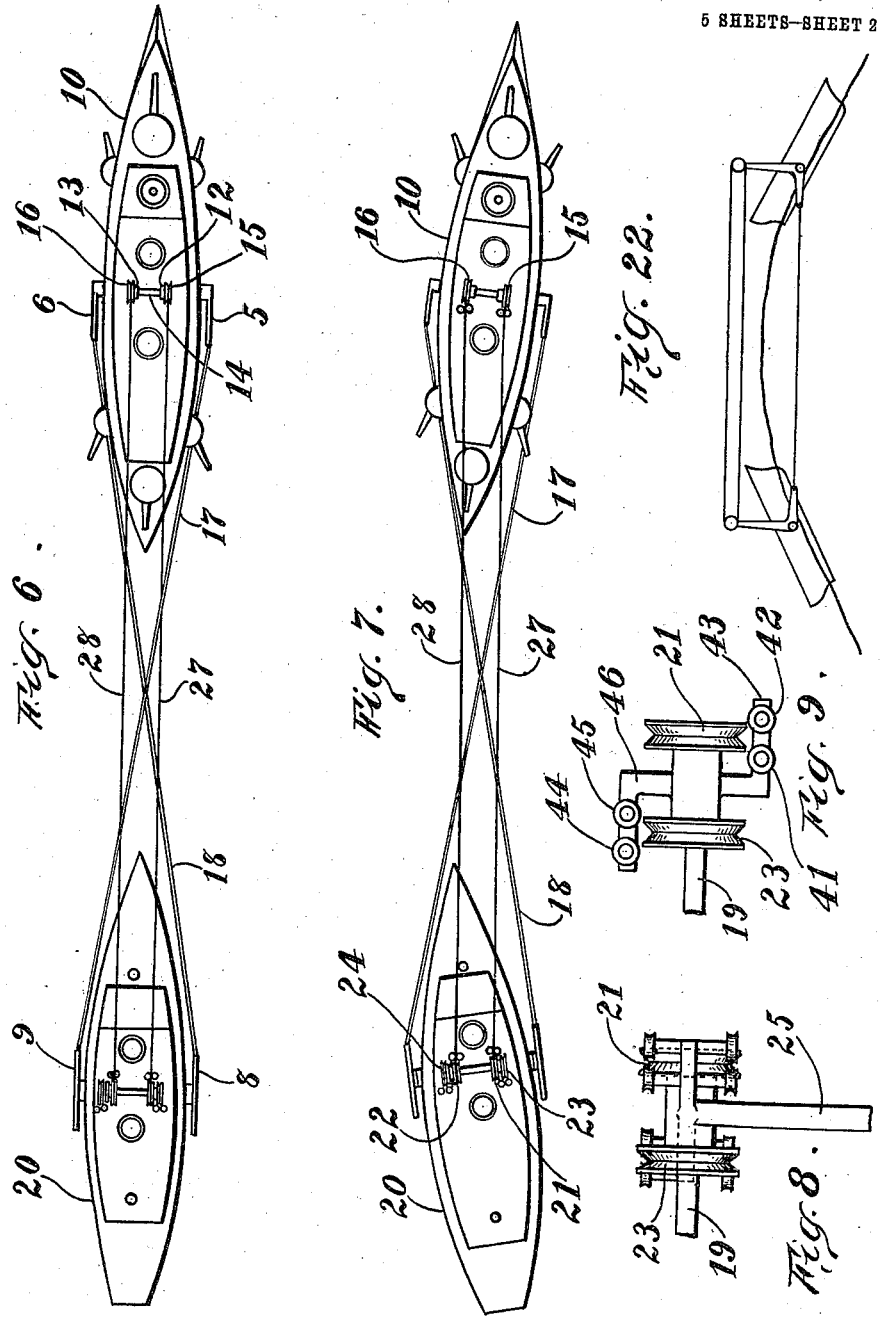

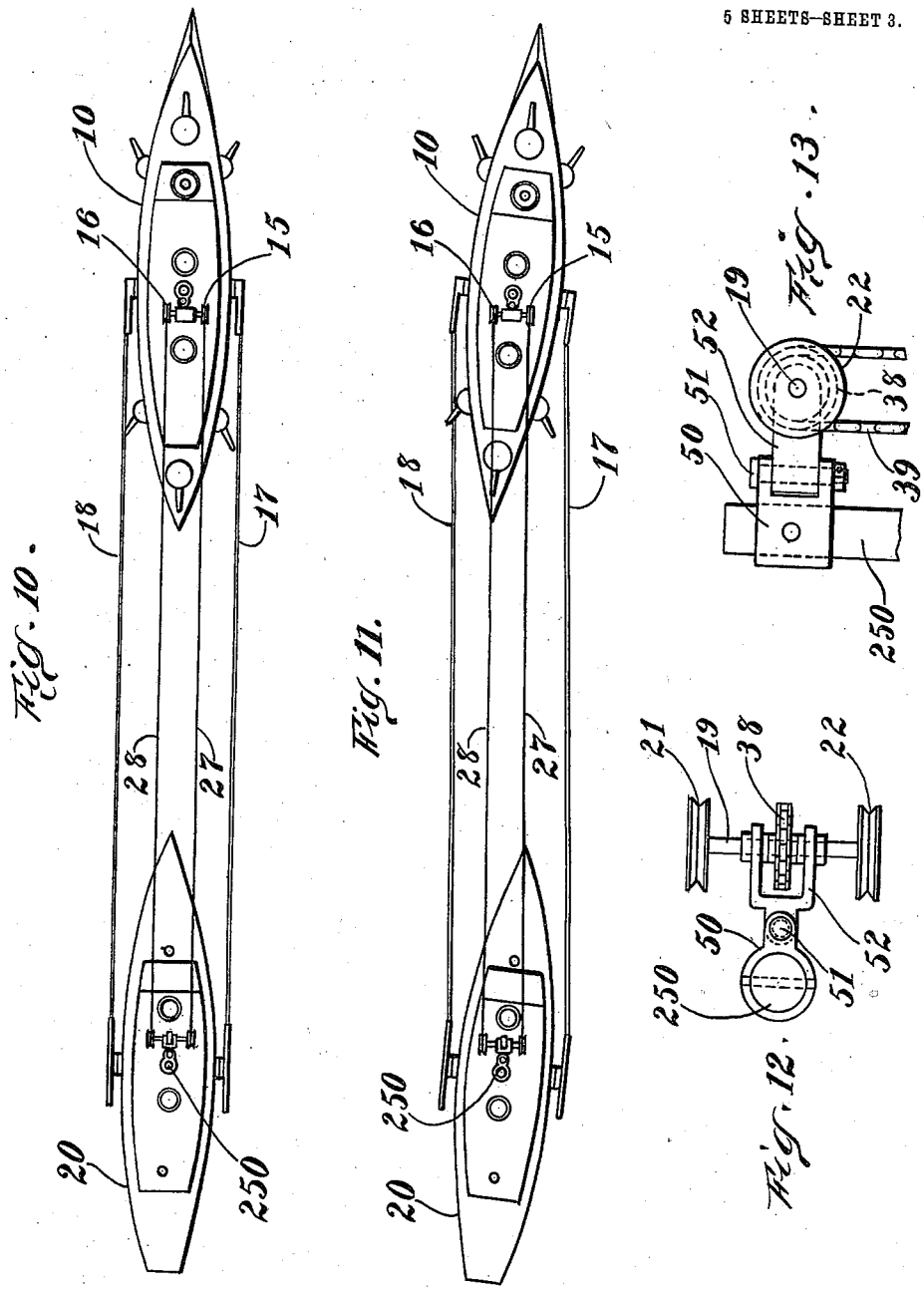

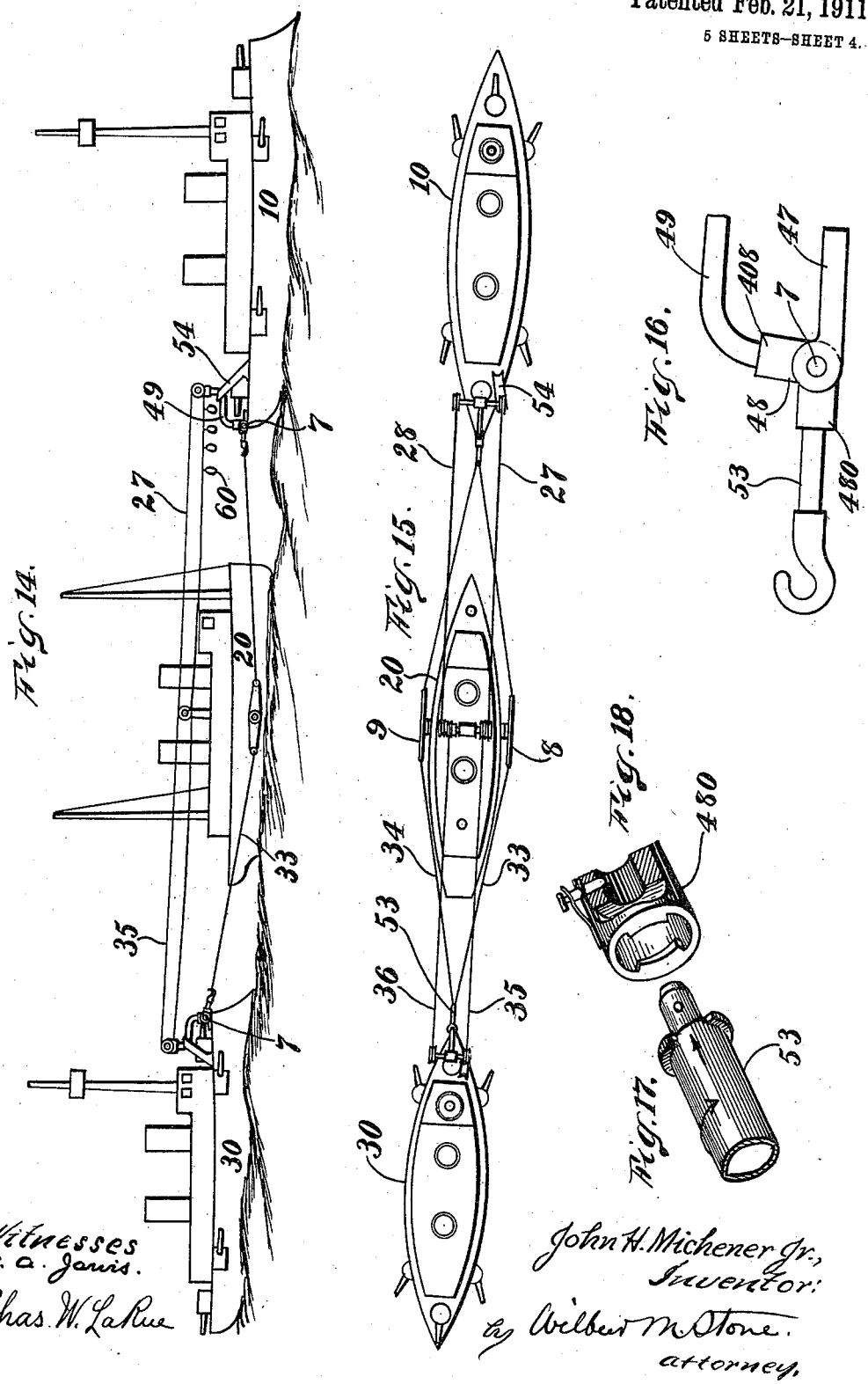

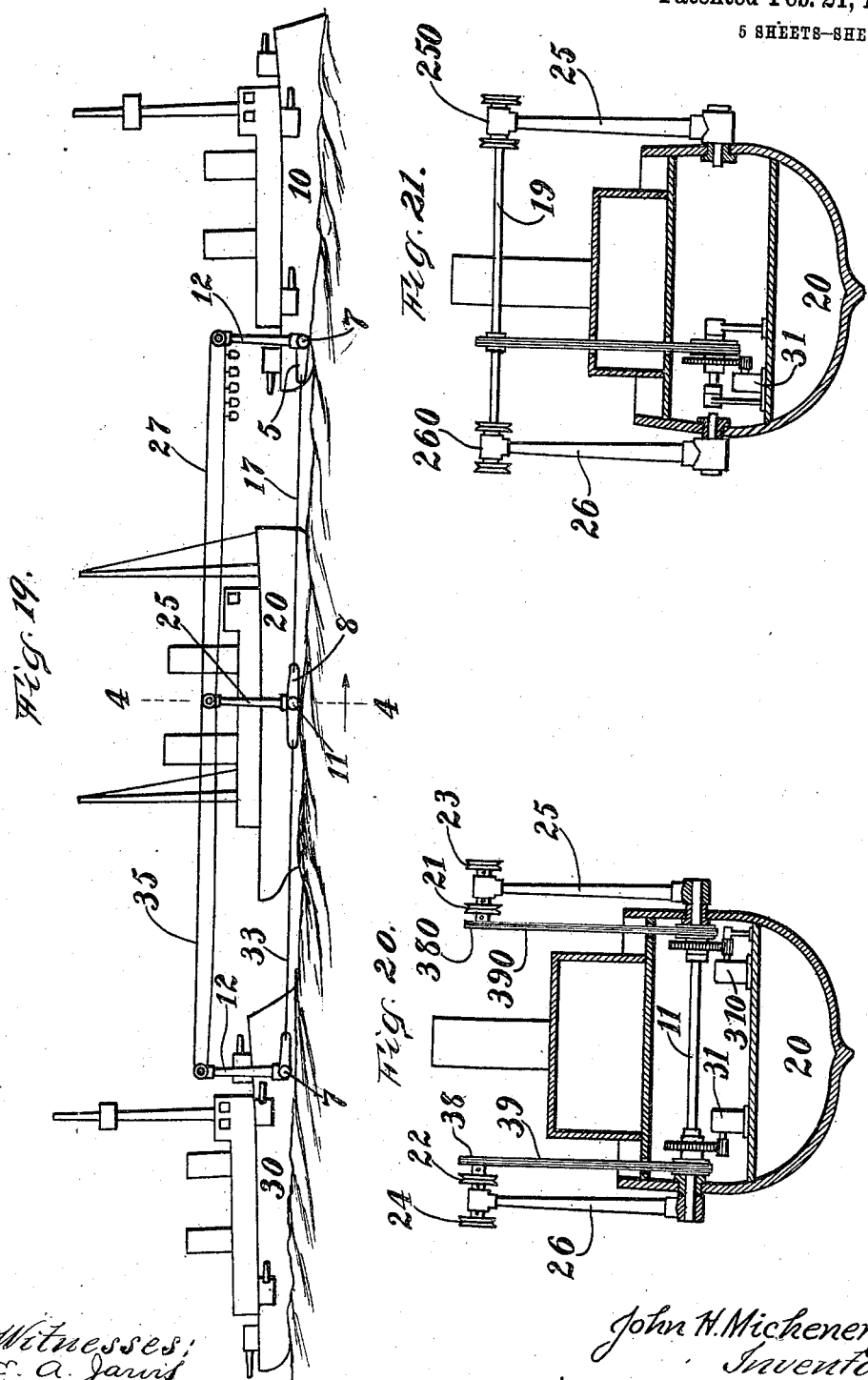

JOHN H. MICHENER, JR., OF NEW YORK, N. Y., ASSIGNOR TO MICHENER STOWAGE COMPANY, OF NEW YORK, N. Y., A CORPORATION OF NEW YORK.

APPARATUS FOR COALING SHIPS AT SEA.

984,692.  Specification of Letters Patent.  Patented Feb. 21, 1911.

Application filed August 2, 1909. Serial No. 510,879.

*To all whom it may concern:*

Be it known that I, JOHN H. MICHENER, Jr., a citizen of the United States, and a resident of New York, in the county of New York and State of New York, have invented certain new and useful Improvements in Apparatus for Coaling Ships at Sea, of which the following is a specification.

This invention relates to apparatus for coaling ships at sea and has for its object to furnish simple and reliable means for transferring coal in large quantities from one ship to another when those ships are in motion.

To that end my improvements comprise means the preferred embodiment of which is illustrated in the drawings accompanying this specification, in which—

Figure 1 is a side elevation of a battleship and a collier equipped with my improved apparatus. Fig. 2 is a vertical cross section on an enlarged scale on line 2, 2 of Fig. 1. Fig. 3 is a sectional elevation on an enlarged scale on line 3, 3 of Fig. 2 of a part of the driving mechanism. Fig. 4 is a vertical cross section similar to Fig. 2 illustrating certain modifications of arrangement. Fig. 5 is an enlarged elevation of a part of the driving mechanism shown in Fig. 2. Fig. 6 is a plan view corresponding with Fig. 1 but including some additional details not shown in said Fig. 1. Fig. 7 is a plan view similar to that of Fig. 6 but showing the vessels in relatively different positions. Figs. 8 and 9 are an elevation and a plan respectively on an enlarged scale of the conveying cable sheaves and guide rolls of Figs. 6 and 7. Figs. 10 and 11 are plan views similar to Figs. 6 and 7 but showing modifications of arrangement and construction. Figs. 12 and 13 are a plan and an elevation respectively on an enlarged scale of the conveying cable sheaves and their mounting of Figs. 10 and 11. Fig 14 is a side elevation similar to that of Fig. 1 but showing ships both forward and aft respectively of the collier for coaling therefrom and illustrating modifications of my improved apparatus. Fig. 15 is a plan view corresponding with Fig. 14. Figs. 16, 17 and 18 illustrate details on an enlarged scale of parts shown in Figs. 14 and 15. Fig. 19 is a side elevation similar to that of Fig. 14 showing modifications of attachments. Fig. 20 is a cross sectional elevation on an enlarged scale on line 4, 4 of Fig. 19. Fig. 21 is a similar view to that of Fig. 20 but showing modifications of details. Fig. 22 is a diagrammatic side elevation illustrating the relative positions of the ships in a seaway.

Heretofore in the art of coaling ships at sea by means of conveyer cables between a towing boat and a towed boat difficulty has been experienced in keeping the conveyer cables taut while relieving them from undue strain due to the relative movements, particularly due to endwise pitching of the vessels. This difficulty has been coped with by means of numerous more or less ingenious devices but all with which I am acquainted are lacking in that simplicity and reliability which is highly essential in apparatus of the class specified.

In the present invention I have furnished means of such simplicity of construction and operation as will greatly facilitate the heretofore dangerous, expensive and lengthy operation of coaling at sea.

My improved apparatus comprises bell-crank mechanism preferably located about midway the length of each ship and having one or more horizontal arms for connection with the towing hawser or hawsers and one or more vertical arms for sustaining the conveyer cables. While I have stated that said bell-crank mechanism is preferably located about midway the length of the ship, I have found that to maintain steerability it is desirable to pivot the bell-cranks at a point slightly forward of the lengthwise center of the ship, and that about one fourteenth of the ship's length forward of said lengthwise center is very satisfactory. I also preferably locate the axes of the bell-cranks at or near the water line. Thus the supporting members of my apparatus are located at or near the region of least motion of the vessels. By this arrangement I minimize movement both actual and relative to the ships of the conveying members of my apparatus, due to rolling or pitching of the ships. Also by keeping the towing hawsers taut I maintain a substantially equal distance between conveyer cable supports irrespective of the relative pitching and tossing of the connected ships. See Fig. 22.

Ship 10 which represents a battle-ship, is equipped for towing and receiving only, arms 5, 6 being fixed to the outboard ends of shaft 7, and reaching rearwardly only therefrom. One or more upstanding arms 12, 13 fixed at their lower ends to shaft 7, carry for free rotation in their upper ends shaft 14 on which are fixed cable sheaves 15, 16.

In Figs. 1, 6, and 7 and in Fig. 2 to an enlarged scale, collier 20 is shown equipped with bell-crank mechanism similar to that just described in reference to ship 10 but the horizontal arms 8, 9 thereof extend both forward and aft from pivotal shaft 11 so as to connect said collier, if desired, with both a leading and a following vessel by means of towing lines as 17, 18 (Figs. 1, 6, 7.) and 33, (Fig. 19,). Shaft 19 in upstanding arms 25, 26 has fixed thereto sheaves 21, 22 between said arms for supporting and driving conveyer cables 27, 28 leading to ship 10, and sheaves 23, 24 outside said arms, for supporting and driving conveyer cables such as 35 and 36, (Fig. 19,) leading to following ship 30.

For driving the conveyer cables I preferably install suitable mechanism in the collier so as to leave the ships to be coaled with a minimum of apparatus. In Figs. 2, 3 and 5 said driving means is illustrated. Therein lower shaft 11 has gear 29 turning freely thereon for engagement with pinion 40 of motor 31. Suitable controlling means 32 for the motor may be installed in some convenient portion of the collier. The hub of gear 29 has fixed thereon sprocket 37 connected by driving chain 39 to sprocket 38 fixed on conveyer cable shaft 19.

In Figs. 1, 6 and 7 I have illustrated towing hawsers 17, 18 as crossed, 17 passing from the starboard side of the towing ship to the port side of the towed ship; hawser 18 is arranged complementary thereto. I have also shown at 55 near the stern of ship 10 in Fig. 1 a sling to keep towing hawser 17 from fouling the propeller. Similar means may be employed to hold any of the other hawsers free of propellers. This crossing of hawsers permits free deviation from a straight course by the two vessels as shown in Fig. 7. Such deviation however tends to cause the conveyer cables to lead obliquely from their sheaves as 21, 22 of collier 20. To counteract this tendency I provide guide rolls as 41, 42 on arm 43 outstanding from upright 25, for sheave 21 and similar rolls 44, 45 on arm 46 for sheave 23. The other sheaves on the several boats may be similarly provided with guide rolls. It will be observed that the relative position of boats 10 and 20 shown in Fig. 7 brings sheaves 15 and 21 nearer together than sheaves 16 and 22, whereby cable 27 will sag more or less below the level of cable 28. As this sagging may be objectionable at times I have illustrated in Figs. 10 to 13 means to obviate this objection. Therein a simple upright 250 extends from shaft 11 of collier 20, having fixed at its upper end collar 50 on vertical pivot 51 of which is supported yoke 52 carrying sheave shaft 19. On the outboard ends thereof are fixed the usual sheaves 21, 22 and midway thereon is fixed sprocket 38 for chain 39. Leading ship 10 is similarly equipped with swivel mechanism for sheaves 15, 16 but driving means are omitted. By the arrangement just described boats 10, 20 may be shifted relatively as shown for instance, in Fig. 11 without affecting the uniformity of sag on conveyer cables 27, 28. Figs. 10 and 11 also illustrate towing hawsers 17, 18 arranged parallel to each other instead of crossed as in Figs. 6 and 7.

In some cases it is undesirable to provide space amidships on a battle ship for the mechanism of my improvements; in Figs. 14 to 18 inclusive I have illustrated an arrangement in which the battle ships 10, 30 are freed of amidship mechanism. Therein pivot shaft 7 is supported on a bracket as 47 attached to bow or stern, as the case may be, of the battle ship. Said shaft 7 has bell crank 48 pivoted thereon. Upright member 408 thereof has inwardly reaching arm 49 upstanding therein and horizontal member 480 has hawser engaging arm 53 out reaching therefrom. Said arms 49 and 53 may be removably mounted in said bell crank 48 by suitable means such as the well known mutilated screw shown in Figs. 17 and 18. Arm 49 is inwardly reaching so as to enable conveyer cables 27, 28 to deliver bags 60 inboard for unloading. A removable chute 54 may be provided to receive the bags. Hawsers 33, 34 may be led from opposite arms 8, 9 of the collier to the hooked end of arm 53.

As illustrated in Figs. 1, 2, 6 and 7 arms 5, 6 of ship 10 may be unshipped and stowed when not in use, as may also arms 8, 9 of collier 20, although it is obviously more desirable to so unship and stow the arms of the battle ship than of the collier. But as shown in said Figs. 1, 2, 6 and 7 it is not convenient to unship inner vertical arms 12, 13 of ship 10 or 25, 26 of collier 20. However in Figs. 19 to 21 I have illustrated an arrangement which will permit the unshipment and stowage of all these arms. Therein uprights as 12 of battle ships 10, 30 are mounted outboard on pivots 7 and may be integral with hawser arms 5. The mechanism of collier 20 may be arranged as shown in Fig. 20 wherein upstanding arms 25, 26 are removably fixed to outboard ends of shaft 11 and carry at their upper ends sheaves 21, 23 and 22, 24 also sprockets 380, 38 for connection by chains 390, 39 to driving means all respectively. Said driving means are therein shown as separate motors 310, 31 for opposite sides. In Fig. 21 shaft 19 is shown extending across from upright 25 to upright 26 and power supplied by one motor 31. In this arrangement bearing brackets 250, 260 may swivel on their respective uprights 25, 26 to prevent cramping of shaft 19 in said bearing brackets.

I have neither shown nor described means for getting the bags of coal to the conveying cables nor means for attaching the bags to the cables or removing them therefrom, as there are several well known means to these ends and such means are not a part of the present invention.

I claim:

1. The combination of two ships each having a bell-crank pivotally mounted thereon, means for connecting the horizontal arms of said bell-cranks and conveying means supported by the vertical arms of said bell cranks.

2. The combination of a towing ship and a towed ship, a bell crank having a horizontal and a vertical arm, pivotally mounted on a horizontal transverse axis on each ship, a towing hawser connecting the horizontal arms of the bell cranks, and conveying means supported by the vertical arms.

3. The combination of two ships each having a bell crank pivotally mounted thereon substantially midway its length on a horizontal transverse axis, means connecting the horizontal arms of said bell cranks and conveying means supported between the vertical arms of said bell cranks.

4. The combination of two ships each having a bell crank pivotally mounted on a horizontal transverse axis at each side thereof means for connecting the horizontal arms of the bell cranks of one ship with those of the other ship and conveying means supported between the vertical arms of the bell cranks of one ship and those of the other ship.

5. The combination of two ships each having a bell crank having a horizontal and a vertical arm, pivotally mounted on a horizontal transverse axis at each side thereof substantially midway the length of the ship, means connecting the horizontal arms of the bell cranks of one ship with the horizontal arms of the bell cranks of the other ship respectively and conveying means supported between the vertical arms of the bell cranks of one ship and those of the other ship respectively.

6. In transfer apparatus for ships the combination of a bell-crank pivotally mounted on a horizontal transverse axis on one ship, means for connecting a towing hawser to the lower arm of said bell-crank and supporting means for a conveying cable on the other arm.

7. In transfer apparatus for ships the combination of a bell-crank pivotally mounted at each side of one ship on a common horizontal axis, means for connecting a towing hawser to each bell crank, and means on the vertical arms of the bell-cranks for supporting conveying means.

8. In transfer apparatus for ships the combination of two bell-cranks fixed to a common transverse horizontal pivotal shaft on one ship, means for connecting a towing hawser to each bell-crank and means on the vertical arms of said bell-cranks for supporting conveying means.

9. In transfer apparatus for ships the combination of two bell-cranks pivotally mounted on a common transverse horizontal axis at either side of one ship adjacent to the water line and substantially midway the length of said ship and means on the vertical arms of said bell-cranks for supporting conveying means.

10. In transfer apparatus for ships the combination of two bell-cranks removably fixed to a common transverse horizontal pivotal shaft in one ship said shaft being adjacent to the water line and substantially midway the length of said ship and means on the vertical arms of said bell-cranks for supporting conveying means.

11. The combination of a towing ship and a towed ship each having a bell-crank pivotally mounted on each side thereof, on a common transverse horizontal axis, means carried by said bell-cranks for supporting towing hawsers between said ships, means carried by the vertical arms of said bell-cranks for supporting conveying means between said ships and means in one of the ships for actuating said conveying means.

12. In transfer apparatus for ships the combination of a bell-crank pivotally mounted on one ship, a removable horizontal arm in the bell-crank, means for attaching a towing hawser thereto, a removable vertical arm in the bell-crank and means thereon for supporting conveying means.

JOHN H. MICHENER, Jr.

Witnesses:
WILLIAM J. FOLEY,
CHARLES W. LA RUE.